United States Patent
L'Allier

(10) Patent No.: US 11,608,160 B2
(45) Date of Patent: Mar. 21, 2023

(54) SYSTEM AND METHOD FOR LANDING GEAR RETRACTION

(71) Applicant: Airbus Operations Limited, Bristol (GB)

(72) Inventor: Paul Gordon L'Allier, Bristol (GB)

(73) Assignee: Airbus Operations Limited, Bristol (GB)

(*) Notice: Subject to any disclaimer, the term of this patent is extended or adjusted under 35 U.S.C. 154(b) by 115 days.

(21) Appl. No.: 16/851,766

(22) Filed: Apr. 17, 2020

(65) Prior Publication Data
US 2020/0331587 A1 Oct. 22, 2020

(30) Foreign Application Priority Data

Apr. 18, 2019 (GB) ...................................... 1905497

(51) Int. Cl.
  *B64C 13/22* (2006.01)
  *B64C 25/26* (2006.01)
  *B64C 25/18* (2006.01)
(52) U.S. Cl.
  CPC .............. *B64C 13/22* (2013.01); *B64C 25/18* (2013.01); *B64C 25/26* (2013.01)
(58) Field of Classification Search
  CPC ......... B64C 13/00; B64C 13/02; B64C 13/04; B64C 13/042; B64C 13/06; B64C 13/14;
  (Continued)

(56) References Cited

U.S. PATENT DOCUMENTS

| 2,580,452 A | * | 1/1952 | Miller ..................... B64C 25/24 |
| | | | 244/102 R |
| 3,138,347 A | * | 6/1964 | Rodrignez ............ B64C 23/005 |
| | | | 244/12.1 |

(Continued)

FOREIGN PATENT DOCUMENTS

| EP | 2 878 534 | 6/2015 |
| EP | 3299296 A1 * | 3/2018 ............. B64C 25/00 |

(Continued)

OTHER PUBLICATIONS

European Search Report cited in EP 20166007.3 dated Sep. 14, 2020, 9 pages.

(Continued)

*Primary Examiner* — Joshua J Michener
*Assistant Examiner* — Ryan Andrew Yankey
(74) *Attorney, Agent, or Firm* — Nixon & Vanderhye P.C.

(57) ABSTRACT

A retractable landing gear on an aircraft is operated by a landing gear control system 20 having a manually operable lever 26 movable from a first, e.g. gear-down, position to a second, e.g. gear-up position, in response to which a signal (e.g. a gear-up command) is outputted causing the landing gear to move to an up position. The landing gear control system 20 also includes a motor 40 configured to move the lever 26 in dependence on a signal, for example a signal received by a landing gear lever control unit 42 from a take-off detection system 46 which indicates that the aircraft has taken-off. Thus, the lever 26 may be considered as being configured both to be operated by a pilot of the aircraft manually and to be operated by the motor automatically.

11 Claims, 6 Drawing Sheets

(58) Field of Classification Search
CPC ......... B64C 13/16; B64C 13/28; B64C 13/32;
B64C 13/34; B64C 13/341; B64C 13/343;
B64C 13/345; B64C 13/44; B64C 25/00;
B64C 25/004; B64C 25/02; B64C 25/08;
B64C 25/10; B64C 25/12; B64C 25/125;
B64C 25/14; B64C 25/16; B64C 25/18;
B64C 25/20; B64C 25/22; B64C 25/24;
B64C 25/26; B64C 25/28; B64C 25/30
See application file for complete search history.

(56) References Cited

U.S. PATENT DOCUMENTS

| | | | |
|---|---|---|---|
| 3,224,713 | A | 12/1965 | Pope |
| 3,511,455 | A | 5/1970 | Weick |
| 5,489,830 | A * | 2/1996 | Fernandez ............. B64C 13/18 318/584 |
| 5,911,390 | A | 6/1999 | Pohling |
| 11,226,639 | B2 * | 1/2022 | De Tarso Ferreira ....................... G05D 1/0808 |
| 2006/0027706 | A1 * | 2/2006 | Lindahl ................... B64C 25/28 244/102 R |
| 2009/0302173 | A1 * | 12/2009 | Hanchey ................. B64C 13/18 244/76 A |
| 2014/0151501 | A1 * | 6/2014 | Kondo .................... B64C 25/22 244/102 R |
| 2015/0027266 | A1 * | 1/2015 | Betts ...................... B64C 25/26 74/524 |
| 2015/0122945 | A1 * | 5/2015 | Kavounas ............... B64C 25/28 244/102 R |
| 2017/0108868 | A1 * | 4/2017 | Johnson ................. B64C 13/40 |

FOREIGN PATENT DOCUMENTS

| | | | |
|---|---|---|---|
| EP | 3 403 924 | 11/2018 | |
| EP | 3403924 A1 * | 11/2018 | .......... B64C 13/503 |
| GB | 561456 | 5/1944 | |
| GB | 2 073 887 | 10/1981 | |
| GB | 2562027 | 11/2018 | |
| JP | 7-156889 | 6/1995 | |
| KR | 20180118793 A * | 10/2018 | .............. B25J 11/00 |

OTHER PUBLICATIONS

Combined Search and Examination Report for GB 1905497.2, dated Oct. 15, 2019, 5 pages.

* cited by examiner

SYSTEM AND METHOD FOR LANDING GEAR RETRACTION

RELATED APPLICATION

This application claims priority to Great Britain patent application 1905497.2, filed Apr. 18, 2019, the entirety of which is incorporated by reference.

BACKGROUND OF THE INVENTION

The present invention concerns a control system for landing gear retraction and a related method. The invention also concerns an aircraft comprising such a control system, and also a kit of parts suitable for converting an existing aircraft into an aircraft comprising such a control system.

The present invention has particular application in relation to large commercial passenger aircraft, but may have application in relation to other types of aircraft having one or more landing gear assemblies which are arranged to extend (for example, to be deployed) and to retract. Once retracted, the landing gear is typically stowed in a landing gear bay, which is closed off with the use of one or more landing gear bay doors. If the time taken for the landing gear to retract after take-off could be shortened that could enable drag to be reduced, by means of reducing the amount of time the landing gear is exposed in the airflow around the aircraft. Retracting the landing gear as soon as possible after take-off also has the potential advantage of providing greater clearance between the aircraft and any obstacles on the ground. Reducing the time a landing gear remains deployed immediately after take-off, even by a fraction of a second, can have significant benefit.

Systems have been proposed in the prior art to initiate the retraction and/or extension of landing gears on an aircraft without human intervention (see for example U.S. Pat. No. 2,580,452). There is a preference however for the pilot of a modern commercial aircraft to have control over when the landing gear is retracted. The retraction of the landing gears on an aircraft is thus typically initiated by the pilot. US 2006/0027706 describes a hybrid system in which there is automated operation of the landing gear bay doors so that the pilot's instruction to retract the landing gear can result in earlier movement of the landing gear to its stowed position (i.e. without needing to wait for the landing gear bay door(s) to open). There are also proposals in the prior art of control systems that provide for the automatic movement of the landing gear of an aircraft, but also allowing a pilot to override manually such automatic movement—see for example, US 2015/0122945.

The present invention seeks to mitigate one or more of the above-mentioned problems. Alternatively or additionally, the present invention seeks to provide an improved control system for retracting a landing gear in an aircraft and/or an improved related method.

SUMMARY OF THE INVENTION

The present invention provides, according to a first aspect, a landing gear control system for an aircraft having a retractable landing gear. The landing gear control system comprises a lever assembly comprising a manually operable lever movable from a first position, for example corresponding to a gear-down command, to a second position, for example corresponding to a gear-up command. Such a lever is typically provided in the cockpit of an aircraft and is operable by a pilot of the aircraft. In response to the lever moving to the second position, the lever assembly outputs a signal, for example an electric (and/or optical) signal, which causes the landing gear to move from a down position to an up position. The landing gear control system also includes one or more motors configured to move the lever from the first position to the second position. The one or more motors are preferably configured to move the lever in dependence on a signal received in response to the aircraft taking-off. Thus, the lever may be considered as being configured both to be operated by a pilot of the aircraft manually and to be operated by the motor automatically.

During operation of certain embodiments of the invention, the motor receives a signal confirming that the aircraft has taken-off and immediately drives the landing gear lever from the first position to the second position, thus initiating a gear-up command, which in turn causes the landing gear to be retracted. This automated retraction of the landing gear, enables the landing gear to be retracted sooner than might otherwise be the case when relying on manual operation of the landing gear lever. It is estimated that a time-saving of at least one second might be achievable, possibly in some cases around two seconds or more. While this might appear to be a rather short amount of timesaving, retracting the aircraft's landing gears even a fraction of a second earlier has significant benefits—for example, it enables drag on the aircraft between take-off and gear retraction to be reduced, with consequent fuel savings and improvements in take-off performance Such improvements in take-off performance may in effect increase the maximum take-off weight for a given aircraft. Such embodiments may be implemented on an existing aircraft with little impact on the other aircraft systems. In addition, importantly, embodiments of the invention do not interfere with the pilot's freedom to override and/or take control of the landing gear lever. The lever assembly and motor may be arranged to allow a pilot to override, for example by manual operation of the lever, movement of the lever by the motor. It may also be the case that the lever can be relied upon by the pilot as providing a clear and unambiguous indication of the last signal commanded to the landing gear (e.g. gear-up or gear-down).

The motor may be in the form of a prime mover. The motor may be an actuator. The motor may be electrically powered.

The lever may be any form of movable device that a pilot can use to issue a gear-up or gear-down command. There may be one lever to issue a gear-up command and a different lever to issue a gear-down command. The lever is preferably arranged to move about a pivot axis. It may be that the lever is moved up to issue a gear-up command and is moved down to issue a gear-down command. The lever could alternatively be rotated clockwise or anticlockwise. The lever may have a handle. The handle may be shaped in the general form of a wheel. The lever assembly may comprise one or more indicators—for example lights and/or a visual display unit—which indicate the status of one or more landing gear. There may be a display which shows whether one or more landing gears is up, down or in transit (i.e. between up and down positions). It will be appreciated that the lever does not necessarily need to act as a mechanical lever or to have any mechanical connection which transmits, via mechanical mechanisms, any force applied to the lever to any part of the landing gear that is moved by action of the lever.

The lever assembly may comprise one or more sensors for detecting the manual operation of the lever, at least during movement of the lever by the motor. The lever assembly may comprise one or more sensors for detecting the position of the lever. The lever assembly may comprise one or more} sensors for detecting the forces on the lever, for example those exerted manually by a user. It may be that the motor is disabled, disconnected from moving the lever, and/or operated in a manner that does not significantly interfere with the pilot's manual operation of the lever, when one or more sensors detect manual operation of the lever. The one or more motors may be arranged to provide force feedback to a user when operating the lever. For example, the one or more motors may be arranged to provide resistance to movement from either of the first position or the second position.

The landing gear control system may comprise a control module, which is arranged to cause the motor to move the lever from the first position to the second position, preferably in response to the aircraft taking-off. For example, the control module may, immediately after the aircraft has been deemed to have taken-off for example, output a signal, which causes the motor to move the lever from the first position to the second position. The control module may be arranged to detect when the aircraft has taken off. The control module may receive one or more signals, which are indicative of take-off. The control module may receive one or more signals, which it then uses to decide whether the aircraft has taken off. The control module may be arranged to detect when the aircraft has taken off on the basis of one or more detected states. One such detected state may be rotation of the aircraft (about a pitch axis for example) from an on-ground orientation to a climb orientation. One such detected state may be a speed of ascent and/or a measure of acceleration upwards. One such detected state may be local altitude (distance from the ground locally). One such detected state may be a weight on wheels measure and/or an indication that one or more (preferably all) wheels of the aircraft landing gears have left the ground. Commercial aircraft typically have one or more systems in place to detect (measure) such states. The installation of a landing gear control system having the above features may therefore be relatively straightforward.

The control module may be configured to detect when a pilot intervenes to stop movement of the lever caused by the motor under the control of the control module. Force feedback sensors may be used to detect when an attempt is made by a pilot to stop or change the automated movement of the lever. It may be the case that if and when the control module detects that a pilot wishes to stop or change the movement of the lever, the control module aborts the automated movement of the lever and passes control of the lever back to the pilot.

The landing gear control system may include a computer processing module arranged to control the movement of the landing gear to the up position. The computer processing module may receive, directly or indirectly, the gear-up command from the lever assembly. There may be more than one computer processing module, each providing the same function, so that the multiple computer processing modules provide redundancy in the aircraft. The computer processing module may be configured to perform a sequence of steps (for example five or more steps performed in series) for retracting the landing gear. The computer processing module may be configured to perform a different sequence of steps for extending the landing gear. There may be a step of moving the landing gear from its extended position. There may be a step of moving one or more landing gear bay doors. There may be a step of unlocking of one or more landing gear bay doors. There may be a step of locking one or more landing gear bay doors. There may be a step of receiving a signal that indicates that one or more landing gear bay doors have been locked and/or unlocked. The computer processing module may also be arranged to control the movement of the landing gear to the down position.

It may be that the lever assembly is arranged to output no more than five different discrete types of signal, for example being those signals which are transmitted to the above-mentioned computer processing module, for example including a signal commanding gear-up and a signal commanding gear-down. There may be a further signal commanding other actions, for example, reducing or removing hydraulic pressure supplied to the landing gear or a part thereof (for example, a "neutral" or "off" command) There may only be two or three discrete types of signal. It may be that the lever has a range of movement from one extreme end to the other, and that the lever assembly only switches into outputting a gear-up command (or gear-down command, depending on the end concerned) when the lever has moved to or beyond a threshold position. There is preferably a threshold position at each end of the range of movement, each threshold position being positioned within 20%, optionally 10%, of the extreme end positions (expressed as a percentage of the full range of movement from one extreme end to the other). Each threshold position may be positioned at an extreme end position. In the case where one or more motors are arranged to provide force feedback to the user when operating the lever, it may be that there is force feedback provided to indicate that the lever has moved to or beyond such a threshold position. The lever assembly may be so arranged that when the lever is in the second position, a signal representing a gear-up command is continuously outputted. The lever assembly may be so arranged that when the lever is in the first position, a signal representing a gear-down command is continuously outputted. The signal, or signals, outputted by the lever assembly may be provided by means of a switch that operates when the lever has moved to a certain position. Such a switch could provide an open circuit or a closed-circuit response when activated. It may be that the computer processing module is arranged to poll the state of the or each switch periodically (typically many times a second) to check for state changes.

There may be one or more sensors arranged to detect when the landing gear is in the extended position and/or to detect when the landing gear is in the retracted position.

The present invention also provides an aircraft including a retractable landing gear, a landing gear retraction system, and a landing gear lever. The landing gear lever may be part of a lever assembly as described above. The landing gear may be arranged for movement to a gear-up position, which movement causes a control signal to be sent and received by the landing gear retraction system to perform retraction of the landing gear. The lever may be arranged such that it is moved automatically to the gear-up position, for example in response to a take-off signal. The lever may also be arranged to allow for manual override, for example by the action of a pilot of the aircraft. The aircraft may include a landing gear control system as claimed or described herein.

The aircraft may be a commercial passenger aircraft, for example an aircraft capable of carrying more than fifty passengers, for example more than one hundred passengers.

Such an aircraft will typically include one or more landing gear assemblies controlled by the landing gear retraction system and/or the landing gear control system. The aircraft may include a nose landing gear (NLG) assembly controlled by the landing gear retraction system and/or the landing gear control system. The aircraft may include one or more main landing gear (MLG) assemblies controlled by the landing gear retraction system and/or the landing gear control system. Each landing gear on the aircraft may be associated with a landing gear bay, which accommodates the landing gear when retracted. The landing gear bay may be associated with one or more doors, which may be moveable to close over, at least partially, the landing gear bay when the landing gear is fully extended and/or when the landing gear is fully retracted. The door(s) may be configured to open to allow passage of the landing gear when moving between its retracted and extended positions. There may be one or more sensors arranged to detect when the one or more landing gear bay door(s) are open and/or to detect when the one or more landing gear bay door(s) are closed. The landing gear bay door(s) may be associated with one or more locks, which lock the door(s) in a closed position. The locks may be moved /retained with the use of one or more actuators, possibly electromechanically operated actuators, comprising solenoid driven valves for example or possibly hydraulic actuators. There may be one or more sensors arranged to detect when the one or more locks are locked and/or to detect when the one or more locks are unlocked. The landing gear retraction system and/or the landing gear control system may receive inputs from and/or send outputs to (in form of electrical and/or optical signals and/or hydraulic signals) to such actuators, sensors and the like.

The present invention also provides a method of retracting a landing gear on an aircraft after take-off. The method may be performed on an aircraft as described or claimed herein, for example. The aircraft may have a landing gear lever arranged to be automatically moved after take-off towards a gear-up command position (which if reached, causes a command to be issued—for example by means of a suitable signal being outputted—resulting in the retraction of the landing gear being commenced). The method may comprise automatically moving a landing gear lever after take-off towards such a gear-up command position. The method may comprise a step, for example performed by a pilot of the aircraft, before at least one of (a) the landing gear fully retracting as a result of a gear-up command being issued and (b) the landing gear lever reaching the gear-up command position, of manually moving the landing gear lever away from the gear-up command position, thus preventing automatic retraction of the landing gear. The aircraft (for example one or more control systems or devices associated with the aircraft) may be configured to abort automatic retraction of the landing gear in the event of a pilot manually moving the landing gear lever during the course of its automated movement. The aircraft (or control systems/devices associated with the aircraft) may be arranged to detect when the pilot moves the landing gear lever during the course of its automated movement. Following the prevention of completion of an automatic retraction of the landing gear, there may be a subsequent step, for example performed by the pilot, of manually moving the landing gear lever to the gear-up command position so that a command is then issued to retract the landing gear. In response to that command so issued, the aircraft may then perform the step(s) required to retract the landing gear. Thus, the pilot may over-ride an automated movement of the landing gear lever and instead (later) move the lever him/herself. The pilot may initiate the manual moving of the landing gear lever away from the gear-up command position during automated movement of the landing gear lever to the gear-up command position, and in so doing causes the automated movement to be modified. It may be that for at least some of the manual operation of the lever by a pilot, the pilot receives force feedback from processor-controlled driving of the lever.

The method may alternatively include a step of a pilot intervening to move manually the landing gear lever to the gear-up command position before it is moved there automatically. For example, before the landing gear lever is automatically moved to the gear-up command position, the pilot may manually move the landing gear lever to the gear-up command position so that a command is then issued to retract the landing gear sooner than would otherwise have been the case. Such a function may be beneficial if ever the automatic movement fails to commence and/or finish in a timely manner after take-off.

There may be provided, in accordance with a further aspect of the invention, a kit of parts for converting an existing aircraft into one according to the present invention as claimed or described herein. Such a kit may comprise one or more motors suitable for converting a landing gear control lever without a motor to one with one or more motors than enable both manual and automatic movement of the lever. The kit may include one or more control modules for controlling the motor(s). The kit may include one or more sensors for sensing manual movement or control of the lever. The kit may include a replacement lever. The kit may include a replacement housing for the lever, the housing optionally including some or all of the hardware necessary to convert an existing aircraft into one according to the present invention as claimed or described herein.

The kit may include a computer program product for programming an existing system on the aircraft to perform one or more steps of the method of the invention as claimed or described herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
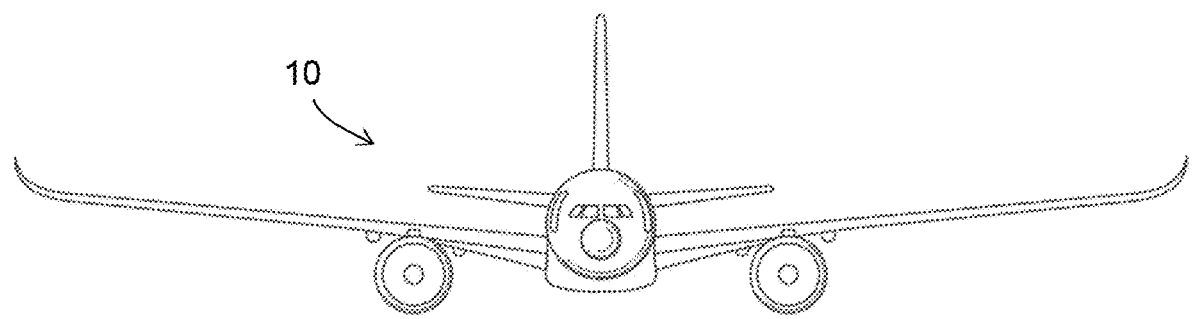
FIGS. 1 and 2 show an aircraft with its nose landing gear and main landing gear assemblies in a retracted position.
Figure 2:
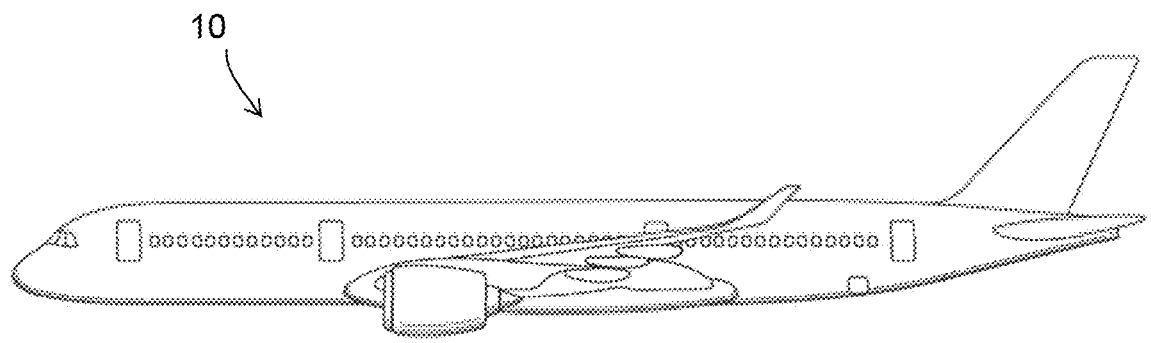
Figure 3:
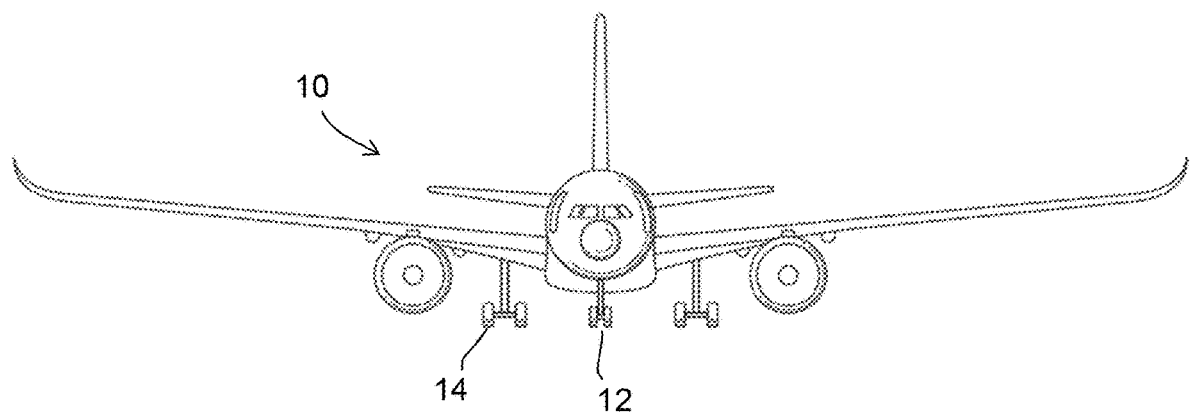
FIGS. 3 and 4 show the same aircraft with its nose landing gear and main landing gear assemblies in an extended position.
Figure 4:
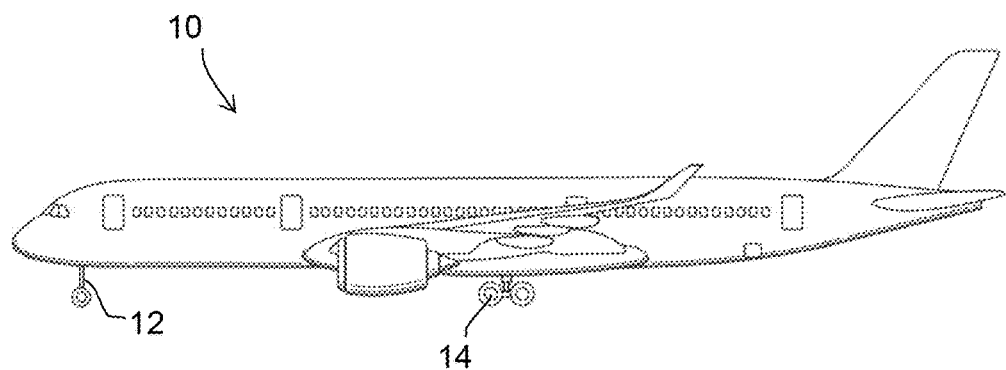

Embodiments of the present invention relate to the retraction of a landing gear on an aircraft shortly after take-off. Such an aircraft is shown in FIGS. 1 to 4. FIGS. 1 and 2 show the aircraft 10 with its nose landing gear (NLG) and main landing gear (MLG) in the retracted position (i.e. stowed). FIGS. 3 and 4 show the same aircraft 10 with its NLG 12 and MLG 14 in the extended position (i.e. deployed).

Figure 5:
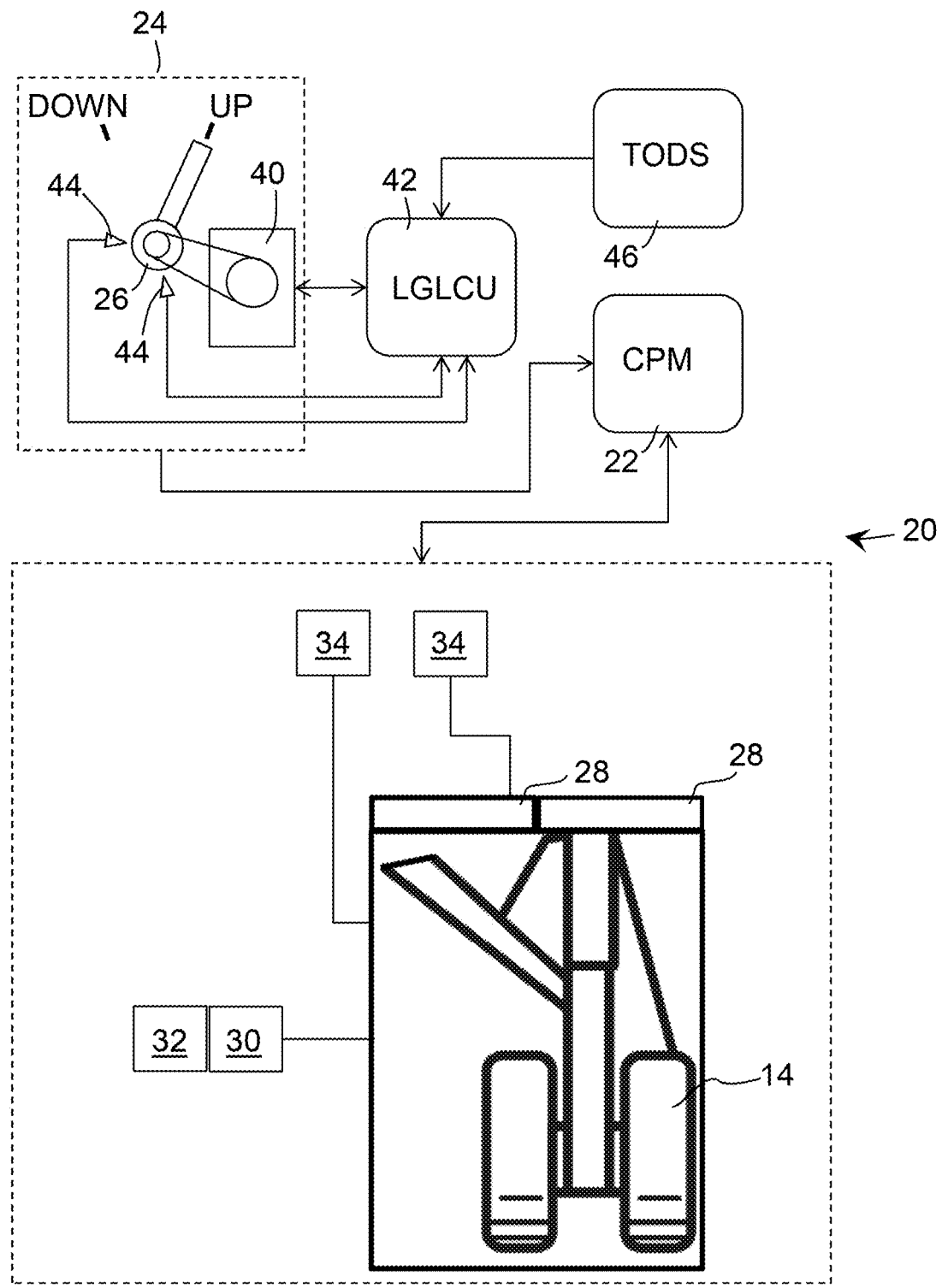
FIG. 5 shows a landing gear control system according to a first embodiment.

FIG. 5 shows a control system 20 for retracting (and also extending) a landing gear 14 according to a first embodiment. The control system comprises a Computer Processing Module (CPM) 22, a landing gear lever (LG lever) assembly 24 and various other controllers 42, 46. There may be two such "CPM"s, which operate, as two independent sides of an avionics control system, thus providing redundancy. Only one side of the system will be described herein. The CPM 22 is configured to perform, on receipt of an appropriate "UP" signal, a sequence of steps for retracting the landing gear and also, on receipt of an appropriate "DOWN" signal, a sequence of steps for extending the landing gear. The pilot is able to cause such an "UP" (or "DOWN") signal to be sent by means of operating a lever 26, provided for that purpose in the flight deck of the aircraft. In FIG. 5, the lever 26 is shown in the "UP" position.

The landing gear bay is associated with doors 28, which are operable to close over the aperture through which the landing gear 14 extends (substantially closing over the aperture when the landing gear is retracted and partially closing over the aperture when the landing gear is extended). Locks are provided for locking the doors in the closed position. Various valves (collectively schematically represented by the box labelled with reference number 30) and associated solenoids (collectively schematically represented by the box labelled with reference number 32) are provided for the operation of the locks. The CPM 22 is configured to issue control signals, which cause movement, activation (for example energizing of a solenoid), deactivation, or other operation of a physical part of the landing gear extension/retraction apparatus. Such control signals may be converted/modified (for example, digitally processed and/or converted between a digital signal and an analogue signal) by avionics systems between transmission from the CPM and receipt by the intended recipient part (solenoid, for example). Also provided are sensors (represented by boxes 34) for detecting when the doors are open/closed and when the locks are locked/unlocked. The CPM 22 is thus also configured to receive sensor signals from such sensors. Such sensor signals may be converted/modified (for example, digitally processed and/or converted between an analogue signal and a digital signal) by avionics systems between transmission from the sensor and receipt by the CPM.

Figure 6:
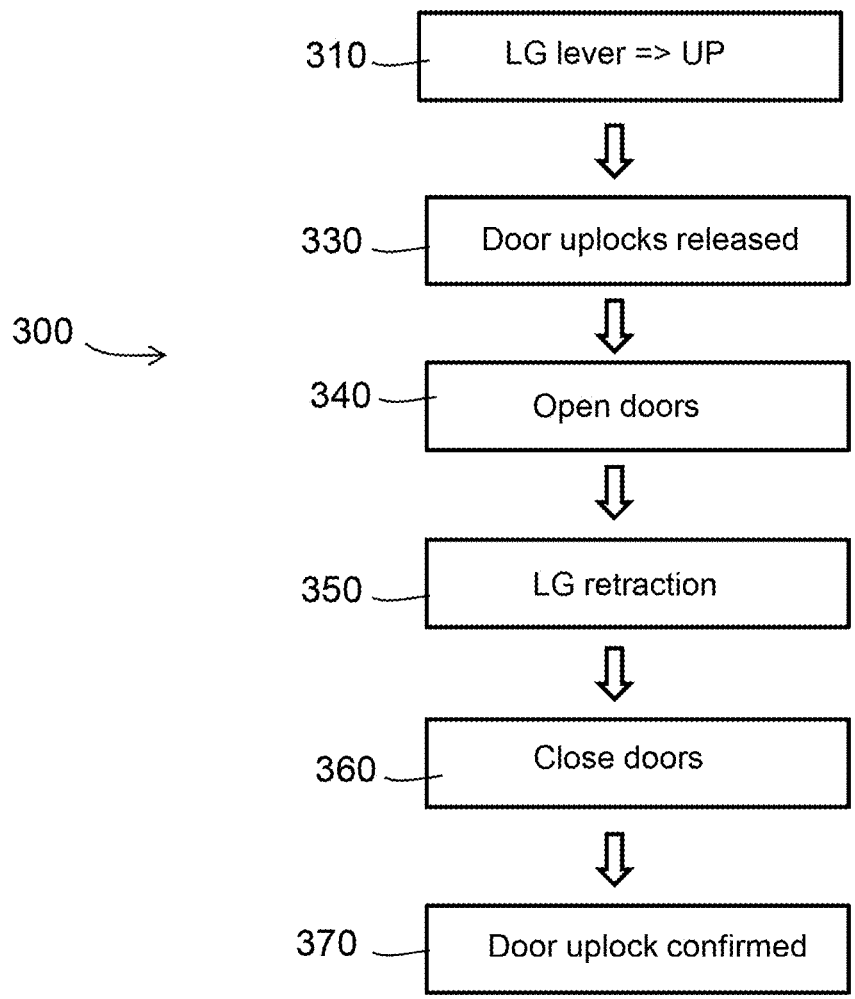
FIG. 6 shows a sequence of steps used to retract a landing gear in accordance with the first embodiment.

FIG. 6 shows a sequence of steps that are performed when retracting the landing gear, in accordance with the first embodiment. As a first step 310, the LG control lever moves to the "UP" position. Then, as a second step 330, the door uplocks are released. As a third step 340, the LG bay doors are opened. Then as a fourth step 350, the LG is retracted. As a fifth step 360, the doors are then closed. Then as a sixth step 370, the door uplock is confirmed.

In accordance with the first embodiment, the LG lever 26 is both manually movable by the pilot and automatically moveable by a motor 40. The motor 40 receives a control signal from a landing gear lever control unit, LGLCU, 42. The LGLCU 42 receives outputs from various sensors associated with the lever and with the motor (only two such sensors 44 being shown in FIG. 5 for the sake of simplicity) to enable the LGLCU to provide force feedback to the pilot when operating the lever. The LGLCU 42 receives a signal from a take-off detection system (TODS) 46. The TODS 46 uses a variety of measures, including all of pitch angle, rate of ascent, altitude and a weight on wheels measure, to determine with certainty that the aircraft has taken off. When the LGLCU 42 receives a signal from the TODS 46 confirming take-off, the LGLCU 42 sends a signal to the motor 40 to move the lever 26 from the "DOWN" position to the "UP" position. Once the lever has been fully moved to the "UP" position, the LG lever assembly 24 outputs a signal which is sent to the CPM 22 to start the sequence of steps that causes the LG 14 to be retracted.

Thus, in a typical operation sequence, the aircraft takes off, the LGLCU causes the lever to move automatically from the DOWN to the UP position, and once the LG lever has reached the "UP" position, the CPM automatically starts the retraction of the LG 14. The pilot is however able to intervene and/or override the movement of the LG lever at any time, by manual operation of the lever. The sensors 44, motor 40 and LGLCU 42, all cooperate together to detect and react to manual operation of the lever. One such case might be when the LG lever starts to move automatically after take-off and the pilot takes a decision to prevent the landing gear from being retracted automatically—and thus intervenes. In such a case, the LGLCU allows the pilot to move the LG lever back to the DOWN position and prevents automatic movement of the LG lever to the UP position (until the system resets by means of the pilot having manually moved the LG lever to the UP position). Another scenario in which a pilot might need to intervene is if the LG lever is not automatically moved after take-off soon enough, in the pilot's opinion. In such a case, he or she might intervene to move the LG lever manually before the motor starts to move it. The pilot may additionally (or alternatively) move the LG lever manually at a faster speed (of rotation) to the UP position than would be caused by operation of the motor alone. The first embodiment lends itself well to being retrofitted onto an existing aircraft and/or being featured in a new aircraft assembly with little modification to existing systems on the aircraft. All that is required is the integration of a force feedback motor system on the LG lever, a suitable control processor (the LGLCU) and the provision of a signal feed to the LGLCU confirming take-off from one or more existing aircraft systems. All other components may already be part of the existing aircraft.

Figure 7:
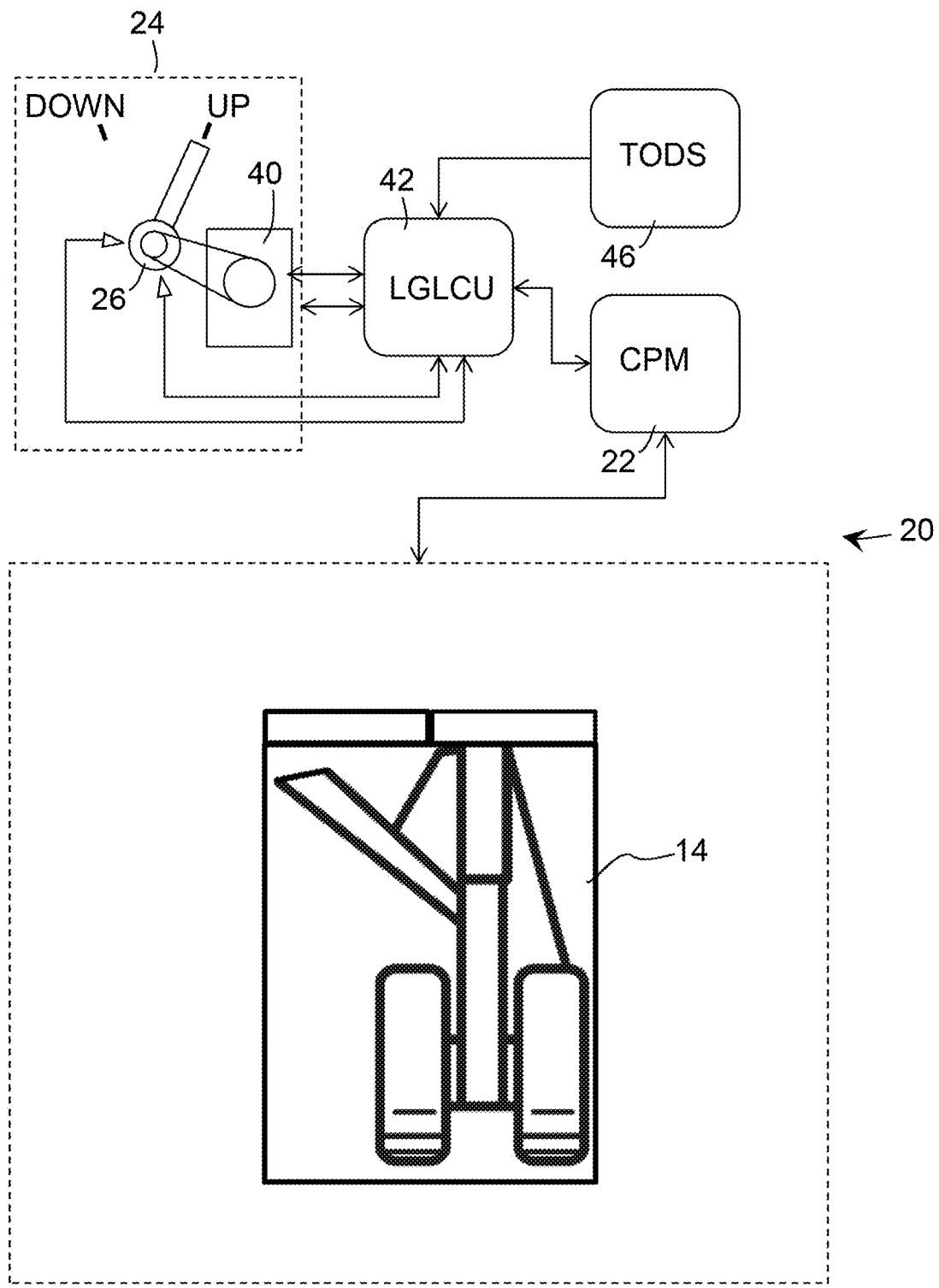
FIG. 7 shows a landing gear control system according to a second embodiment.

FIG. 7 shows a second embodiment, using the same reference numerals. Only the significant differences will now be described. The reference numerals/boxes for the LG doors, the valves, associated solenoids, and sensors are omitted (purely for the sake of simplifying the Figure). It will be seen that in this case, there is no control signal from the LG lever assembly 24 to the CPM 22. In this embodiment, the CPM 22 receives the "UP" or "DOWN" command from the LGLCU 42. The LGLCU thus receives the take-off confirmation from the TODS 46, detects when the LG lever reaches an "UP" or "DOWN" position (whether automatically or manually or a combination of the two) and controls the operation of the motor 40.

Figure 8:
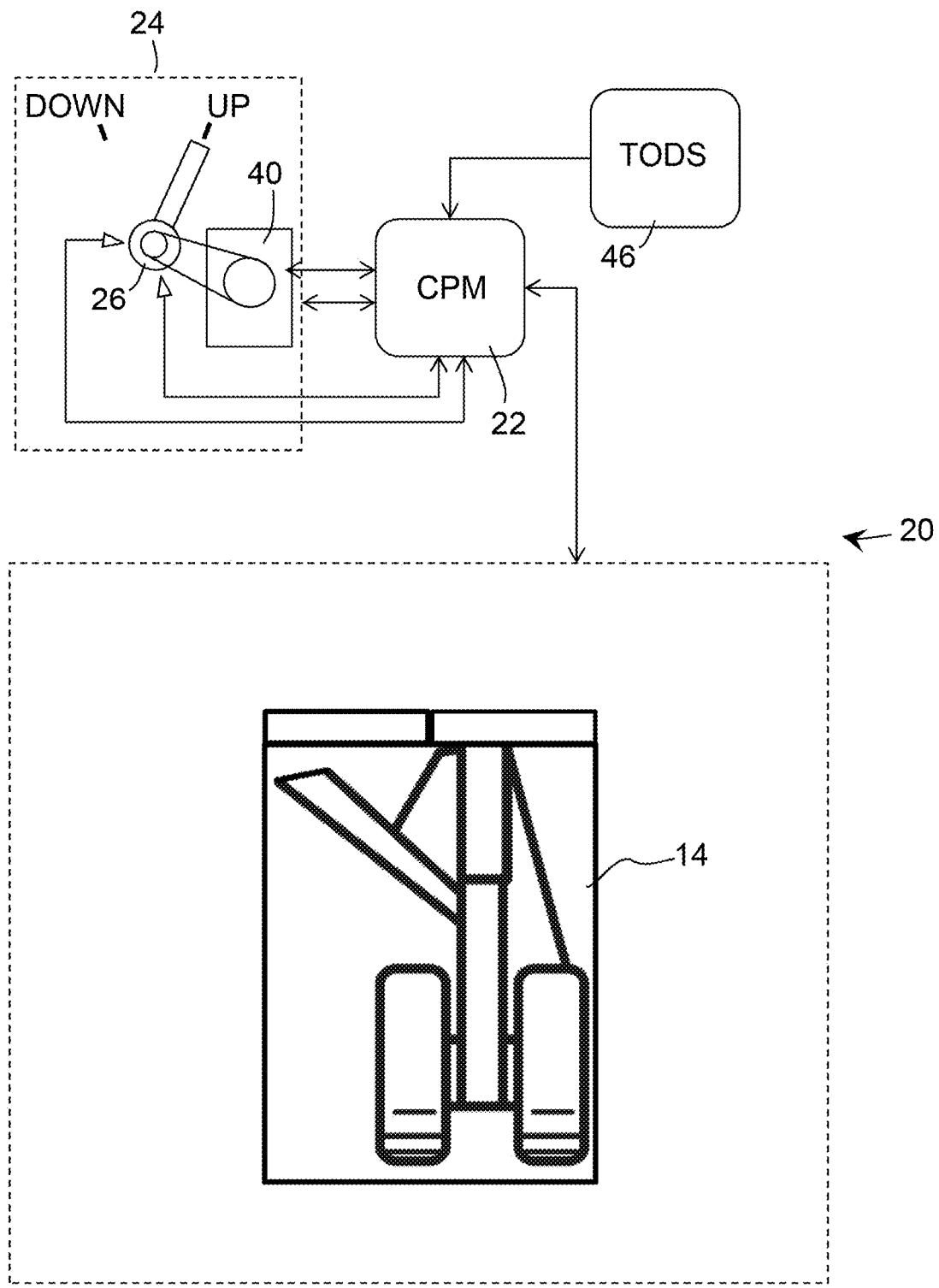
FIG. 8 shows a landing gear control system according to a third embodiment.

FIG. 8 shows a third embodiment, using the same reference numerals as FIG. 7. Only the significant differences will now be described. It will be seen that in this case, that there is no separate LGLCU and instead control of the LG lever assembly 24 is performed entirely by the CPM 22. Thus, in this embodiment, the CPM 22 receives the "UP" or "DOWN" command from the LG lever assembly 24, receives the take-off confirmation from the TODS 46, detects when the LG lever reaches an "UP" or "DOWN" position (whether automatically or manually or a combination of the two) and controls the operation of the motor 40.

Whilst the present invention has been described and illustrated with reference to particular embodiments, it will be appreciated by those of ordinary skill in the art that the invention lends itself to many different variations not specifically illustrated herein.

The control systems needed to operate the LG retraction and to control the automated movement of the pilot's LG lever in the cockpit could be provided in any number of different ways. The embodiments could also similar provide automated LG deployment, at a suitable moment before landing, by means of automatically moving the LG lever in a manner that could be overridden by the pilot.

It will be appreciated that two levers may alternatively be provided one for initiating a "DOWN" instruction and the other for initiating an "UP" instruction.

In the Figures, the LG lever is shown to be automatically moveable by a motor, which has the appearance of a rotary motor. It will be appreciated that a linear actuator, a different prime mover device, or other types of apparatus for causing movement could instead be used.

It may be that the LG lever housing contains the LG lever control unit (LGLCU).

It may be that the function of the CPM, LGLCU and/or the TODS could be combined into one computer processing unit. For example, some or all of the functionality of the TODS could be provided as part of the CPM in the embodiment shown in FIG. 8.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. The term 'or' shall be interpreted as 'and/or' unless the context requires otherwise.

The invention claimed is:

1. A landing gear control system for an aircraft having a retractable landing gear, the landing gear control system comprising
   a lever assembly comprising a manually operable lever movable from a first position to a second position, the lever assembly configured to, in response to the lever moving to the second position, to output a gear-up command that causes the landing gear to move from a down position to an up position,
   a motor configured to automatically move the manually operable lever from the first position to the second position in response to a signal received in response to the aircraft taking-off,
   the manually operable lever configured to be operated by a pilot of the aircraft manually and automatically operated by the motor, and
   a control module configured to output the signal responded to by the motor to automatically move the manually operated lever from the first position to the second position;
   wherein the control module is configured to automatically detect when the aircraft has taken-off with the use of at least one detected state of the aircraft; and
   the control module is configured to automatically output the signal to move the lever immediately after the control module detects that the aircraft has taken off.

2. The landing gear control system according to claim 1, wherein the lever assembly and the motor are configured to allow a pilot to override, by manual operation of the lever, movement of the lever by the motor.

3. The landing gear control system according to claim 2, wherein the lever assembly comprises one or more sensors configured to detect manual operation of the lever at least during movement of the lever by the motor.

4. The landing gear control system according to claim 1, wherein the motor is configured to provide force feedback to a user when operating the lever.

5. The landing gear control system according to claim 1, further including a control module configured to detect when the aircraft has taken off and, in response to the detection of the aircraft having taken off, to output the signal which causes the motor to move the lever from the first position to the second position.

6. The landing gear control system according to claim 1, including a computer processing module configured to receive the gear-up command from the lever assembly and to control the movement of the landing gear to the up position.

7. An aircraft including
   a retractable landing gear,
   a landing gear retraction control system,
   a landing gear lever configured to move to a gear-up position which movement causes a control signal to be sent and received by the landing gear retraction control system to perform retraction of the landing gear,
   wherein the landing gear lever is configured to:
     (a) move automatically to the gear-up position in an immediate response to a take-off signal, and
     (b) allow for manual override by the action of a pilot of the aircraft of the automatic movement;
   a take-off detection system configured to sense a plurality of pitch angle of the aircraft, altitude of the aircraft, rate of ascent of the aircraft and weight on a wheel of the aircraft; and
   a control module configured to output the take-off signal in response to a signal from the take-off detection system indicating the aircraft has taken off, wherein the control module is configured to output the take-off signal immediately after a detection that the aircraft has taken off.

8. An aircraft including a landing gear control system according to claim 1.

9. The landing gear control system of claim 1, wherein the lever assembly has a range of movement from a first extreme end to a second extreme end, the lever assembly is configured to output a gear-up command when the lever moves to or beyond a threshold position between the first extreme and the second extreme.

10. The aircraft of claim 7, wherein the lever assembly has a range of movement from a first extreme end to a second extreme end, the lever assembly is configured to output a gear-up command when the lever moves to or beyond a threshold position between the first extreme and the second extreme.

11. The aircraft of claim 10, wherein the motor is configured to provide force feedback to the lever to indicate that the lever has moved to or beyond the threshold position at which the lever assembly is configured to output a gear-up command.

\* \* \* \* \*